(12) United States Patent
Kobayashi et al.

(10) Patent No.: US 7,957,367 B2
(45) Date of Patent: Jun. 7, 2011

(54) IP TELEPHONE APPARATUS, ENUM SERVER, AND CALLING METHOD VIA THE INTERNET

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1343 days.

(21) Appl. No.: 11/140,907

(22) Filed: Jun. 1, 2005

(65) Prior Publication Data

US 2005/0286499 A1    Dec. 29, 2005

(30) Foreign Application Priority Data

Jun. 28, 2004    (JP) ............... P2004-190384

(51) Int. Cl.
*H04L 12/66*    (2006.01)
(52) U.S. Cl. ................... 370/352; 370/395.2
(58) Field of Classification Search .......... 370/355, 370/466, 231, 395.54, 352, 351
See application file for complete search history.

(56) References Cited

U.S. PATENT DOCUMENTS

| | | | |
|---|---|---|---|
| 6,097,793 A |   | 8/2000 | Jändel |
| 6,157,636 A | * | 12/2000 | Voit et al. .................... 370/353 |
| 6,324,264 B1 | * | 11/2001 | Wiener et al. ............... 379/88.22 |
| 6,359,880 B1 | * | 3/2002 | Curry et al. .................... 370/352 |
| 6,373,817 B1 | * | 4/2002 | Kung et al. .................... 370/217 |
| 6,539,077 B1 |   | 3/2003 | Ranalli et al. |
| 6,594,254 B1 | * | 7/2003 | Kelly .............................. 370/352 |
| 6,785,266 B2 | * | 8/2004 | Swartz ........................... 370/352 |
| 6,917,612 B2 | * | 7/2005 | Foti et al. ....................... 370/352 |
| 6,968,050 B1 | * | 11/2005 | Pershan et al. ................ 379/196 |
| 7,508,819 B2 | * | 3/2009 | Kobayashi et al. .......... 370/352 |
| 7,586,898 B1 | * | 9/2009 | Koch et al. .................... 370/352 |
| 7,623,645 B1 | * | 11/2009 | Scott et al. ............... 379/207.02 |
| 2001/0055299 A1 | * | 12/2001 | Kelly ............................ 370/352 |
| 2002/0095516 A1 |   | 7/2002 | Nada |
| 2002/0114333 A1 | * | 8/2002 | Xu et al. ........................ 370/392 |
| 2003/0002637 A1 | * | 1/2003 | Miyauchi et al. .......... 379/93.01 |
| 2003/0074461 A1 | * | 4/2003 | Kang et al. .................... 709/230 |

(Continued)

FOREIGN PATENT DOCUMENTS

DE    19813179    9/1999

(Continued)

OTHER PUBLICATIONS

Network Working Group M. Mealing R. Daniel Request for Comments: 2915 Updates: 2168 Sep. 2000.*

(Continued)

*Primary Examiner* — Nathan Flynn
*Assistant Examiner* — Wutchung Chu
(74) *Attorney, Agent, or Firm* — Greenblum & Bernstein, P.L.C.

(57) ABSTRACT

An ENUM server stores NAPTR records including PSTN telephone numbers and the corresponding IP telephone numbers of a source IP telephone apparatus and a destination IP telephone apparatus. When the ENUM server receives an ENUM query from the source IP telephone apparatus, the ENUM query setting a domain name based on the PSTN telephone number, the ENUM server searches for a NAPTR record corresponding to the domain name and returns, to the source IP telephone apparatus, an ENUM response including the NAPTR record. When receiving the ENUM response from the ENUM server, the source IP telephone apparatus retrieves the IP telephone number of the destination IP telephone apparatus, the IP telephone number being specified in the NAPTR record contained in the ENUM response, and starts a call connection sequence with the destination IP telephone apparatus.

3 Claims, 14 Drawing Sheets

U.S. PATENT DOCUMENTS

| | | |
|---|---|---|
| 2004/0017901 A1 | 1/2004 | Lim |
| 2004/0057421 A1* | 3/2004 | Kawabata et al. ............ 370/352 |
| 2004/0171372 A1 | 9/2004 | Takudome |
| 2005/0025294 A1* | 2/2005 | Matsuhashi et al. ....... 379/88.17 |
| 2005/0188110 A1* | 8/2005 | Hollatz ........................ 709/244 |
| 2005/0226223 A1* | 10/2005 | Kaizawa et al. ............. 370/352 |
| 2005/0243805 A1* | 11/2005 | Kaizawa et al. ............. 370/352 |
| 2005/0249344 A1* | 11/2005 | Mueller et al. ........... 379/207.15 |
| 2005/0286695 A1* | 12/2005 | Pershan et al. ................ 379/196 |
| 2006/0018311 A1* | 1/2006 | Kobayashi et al. ........... 370/356 |
| 2006/0083222 A1* | 4/2006 | Miyajima et al. ............. 370/352 |
| 2007/0106612 A1* | 5/2007 | O'Brien et al. ................ 705/44 |

FOREIGN PATENT DOCUMENTS

| | | |
|---|---|---|
| EP | 1385320 | 1/2004 |
| EP | 1396989 | 3/2004 |
| JP | 2002-300283 A | 10/2002 |
| JP | 2003-125032 | 4/2003 |
| JP | 2004-153317 A | 5/2004 |
| JP | 2004-180264 | 6/2004 |
| KR | 2002-0048173 | 6/2002 |
| KR | 2004-0028333 | 4/2004 |
| WO | 01/20890 | 3/2001 |
| WO | 01/31900 | 5/2001 |

OTHER PUBLICATIONS

Lind, "ENUM Call Flows for VoIP Interworking," IEFT Standard-Working-Draft, Internet Engineering Task Force, IEFT, CH, No. 3, Feb. 2002.

Anonym, "Report of the Department of State ITAC-T Advisory Committee Study Group A Ad Hoc on ENUM," Unknown, Jun. 6, 2001.

Faltstrom et al., "The E.164 to Uniform Resource Identifiers (URI) Dynamic Delegation Discovery System (DDDS) Application (ENUM)," IETF Standard, Internet Engineering Task Force, IETF, CH, Apr. 2004.

Rosenberg et al., "SIP: Session Initiation Protocol," IETF Standard, Internet Engineering Task Force, IETF, CH, Jun. 2002.

Butcher et al., "SIP Telephony Device Requirements, Configuration and Data", IETF Standard-Working-draft, Internet Engineering Task Force, No. 3, Feb. 2004.

English language Abstract of JP 2004-153317 A, May 27, 2004.

English language Abstract of JP 2002-300283 A, Oct. 11, 2002.

U.S. Appl. No. 11/082,796 to Kaizawa et al., filed Mar. 18, 2005.

English Language Abstract of JP 2003-125032.

English Language Abstract of KR 2004-0028333.

English Language Abstract of KR 2002-0048173.

Japan Office action, mail date is Mar. 1, 2011.

* cited by examiner

Fig.4

| Enum domain name | | Order | Preference | Flags | Service | | URI scheme | |
|---|---|---|---|---|---|---|---|---|
| | | | | | | | | URI |
| 0.0.0.0.0.0.0.1.3.1.8.e164.arpa | IN NAPTR | 100 | 10 | "u" | "E2U+sip" | "!^.*$!sip:" | | 05011112222@tokyo.sip.jp" |
| | IN NAPTR | 100 | 10 | "u" | "E2U+http" | "!^.*$!http:" | | //www.tokyo.sip.com/user05011112222.html" |
| 1.0.0.0.0.0.0.1.3.1.8.e164.arpa | IN NAPTR | 100 | 10 | "u" | "E2U+sip" | "!^.*$!sip:" | | 05033334444@tokyo.sip.jp" |
| | IN NAPTR | 100 | 10 | "u" | "E2U+http" | "!^.*$!http:" | | //www.tokyo.sip.com/user05033334444.html" |

NAPTR resource record

Fig.5

| URI | IP address |
|---|---|
| 05011112222@tokyo.sip.jp | 192.168.1.1 |
| 05033334444@tokyo.sip.jp | 192.168.1.2 |
| 05055556666@tokyo.sip.jp | 192.168.1.3 |
| 05077778888@tokyo.sip.jp | 192.168.1.4 |

Fig.7

INVITE sip:10000001@voip.ne.jp SIP/2.0
Via:SIP/2.0/UDP@voip.ne.jp:5060;branch=721e418c4.1
From:sip:05011112222@voip.ne.jp
To:sip:05033334444/@tokyo.sip.jp;tag=1111

Fig.12

| Enum domain name | | Order | Preference | Flags | Service | | URI scheme | |
|---|---|---|---|---|---|---|---|---|
| | | | | | | | | URI |
| 2.2.2.2.1.1.1.1.0.5.0.e164.arpa | IN NAPTR | 100 | 10 | "u" | "E2U+sip" | "!^.*$!sip:" | | 05011112222@tokyo.sip.jp" |
| | IN NAPTR | 200 | 10 | "u" | "E2U+voice:tel" | "!^.*$!tel:" | | 81310000000;svc=voice" |
| 4.4.4.4.3.3.3.3.0.5.0.e164.arpa | IN NAPTR | 100 | 10 | "u" | "E2U+sip" | "!^.*$!sip:" | | 05033334444@tokyo.mail.com" |
| | IN NAPTR | 200 | 10 | "u" | "E2U+voice:tel" | "!^.*$!tel:" | | 81310000001;svc=voice" |

NAPTR resource record

IP TELEPHONE APPARATUS, ENUM SERVER, AND CALLING METHOD VIA THE INTERNET

BACKGROUND OF THE INVENTION

1. Field of the Invention

The present invention relates to an IP telephone apparatus, an ENUM server, and a calling method via the Internet.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. It is also known that, when a PSTN (Public Switched Telephone Network) (hereafter referred to as PSTN) telephone apparatus connected to a conventional PSTN places a call to an IP telephone apparatus, a telephone number which begins with "050" is dialed. Some IP telephone apparatuses are able to have a conventional PSTN telephone function as well and can use a telephone number in an OABJ system as well as an IP telephone number.

The telephone apparatus described in Related Art 1 also functions as an IP telephone apparatus. When the telephone apparatus functions as a conventional PSTN telephone as well as an IP telephone apparatus, the telephone apparatus maintains a PSTN telephone number as well as an IP address. When receiving or placing a call, the telephone apparatus transmits, to another telephone apparatus, an IP address of the telephone apparatus. The telephone apparatus then determines whether another telephone apparatus is an IP telephone apparatus or a PSTN telephone apparatus by checking whether there is a response to the transmitted IP address from another telephone apparatus. The telephone apparatus then makes interconnection with another telephone apparatus as a source IP telephone apparatus or a destination IP telephone apparatus (or PSTN telephone apparatus), via either the IP network or the PSTN.

[Related Art 1] Japanese Laid Open Publication 2003-125032

However, when placing a call to the IP telephone apparatus that has the PSTN telephone function as well and that can use both PSTN telephone numbers in the OABJ system and IP telephone numbers, users on the transmitting side need to memorize PSTN telephone numbers as well as IP telephone numbers, which has been a burden to those users.

Also, the telephone apparatus described in Related Art 1 that functions as an IP telephone apparatus, when placing a call to another IP telephone apparatus (or PSTN telephone apparatus), transmits, to another telephone apparatus, the IP address of the telephone apparatus, at the reception or transmission of a call. The telephone apparatus then determines whether another telephone apparatus is an IP telephone apparatus or a PSTN telephone apparatus by checking whether there is a response to the transmitted IP address from another telephone apparatus. The IP telephone apparatus then makes interconnection with another telephone apparatus via either the IP network or the PSTN. This system does not reduce the workload for users of the IP telephone apparatus, because they need to memorize both PSTN telephone numbers and IP telephone numbers.

SUMMARY OF THE INVENTION

The present invention is provided to address the above-described problems. The purpose of the present invention is to provide an IP telephone apparatus, an ENUM server, and a calling method that reduce a burden on users by automatically switching from a call using a PSTN telephone number to a call using an IP telephone number, or switching from the call using the IP telephone number to the call using the PSTN telephone number, when placing a call to the IP telephone apparatus that can use both PSTN telephone numbers and IP telephone numbers.

The present invention relates to the ENUM server that stores a NAPTR resource record corresponding to the PSTN telephone number and the IP telephone number of the IP telephone apparatus. The ENUM server receives, from the source IP telephone apparatus via the IP network, a query that sets the PSTN telephone number of the destination IP telephone apparatus. The ENUM server searches for a NAPTR resource record including the PSTN telephone number and the corresponding IP telephone number in response to the query. The ENUM server returns, to the destination IP telephone apparatus, the retrieved NAPTR resource record.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 illustrates an example of NAPTR records stored in a DB of the ENUM server according to the first embodiment of the present invention;

FIG. 5 illustrates an example of data stored in a DB of a DNS server according to the first embodiment of the present invention;

FIG. 7 illustrates an example of the "INVITE" message transmitted from the source IP telephone apparatus to the destination IP telephone apparatus in FIG. 6;

FIG. 12 illustrates an example of NAPTR records stored in a DB of an ENUM server according to the second embodiment of the present invention;

DETAILED DESCRIPTION OF PREFERRED EMBODIMENTS

The embodiments of the present invention are explained in the following, in reference to the above-described drawings.

First Embodiment

Figure 1:
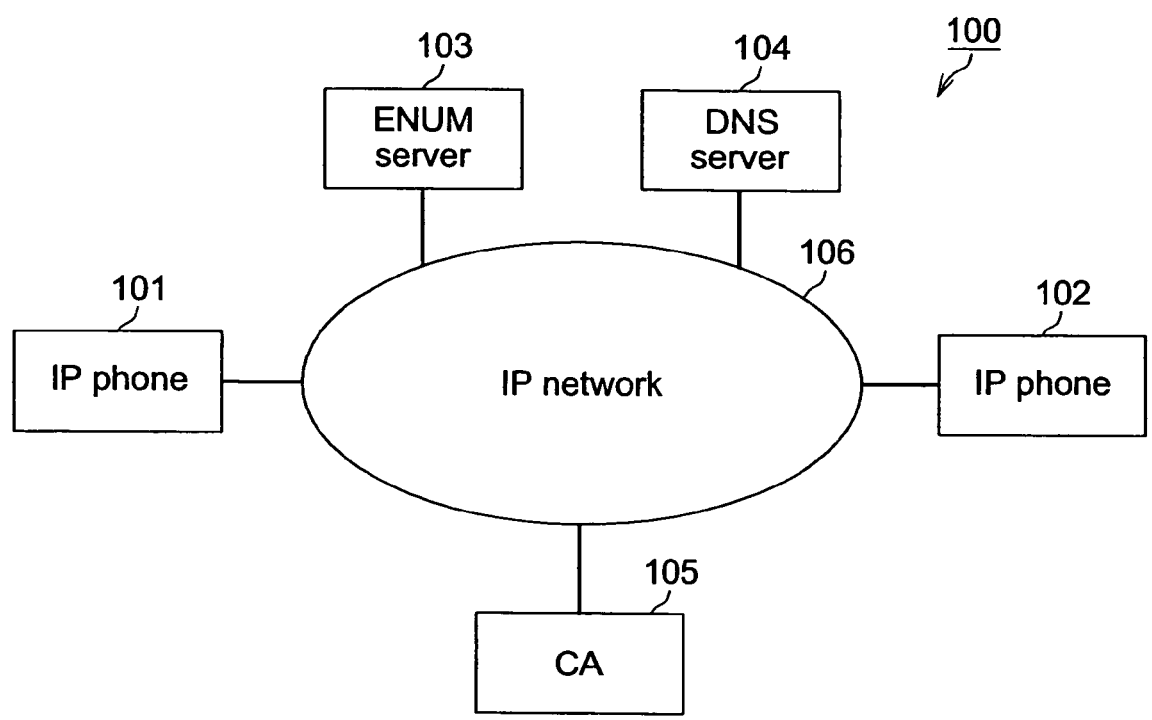
FIG. 1 illustrates a configuration of an IP telephone system according to the first embodiment of the present invention.

FIG. 1 illustrates the entire configuration of an IP telephone system according to the first embodiment of the present invention. In IP telephone system 100 shown in FIG. 1, a plurality of IP telephone apparatuses (hereafter referred to as "IP phone") 101, 102, ENUM server 103, DNS server 104 and Call Agent (hereafter referred to as "CA") 105 are interconnected via IP network 106. Also, the IP telephone system is not limited to the present embodiment and may be configured to connect three or more IP phones.

IP phone 101 (102) has a function enabling voice communication with another IP phone via IP network 106.

ENUM (Telephone Number Mapping) server 103 stores a database (hereafter referred to as "DB") registering a NAPTR (The Naming Authority Pointer) resource record (hereafter referred to as "NAPTR record"). ENUM server 103 returns, to IP phone 101 (102), a NAPTR record registered in the DB, in response to a query from IP phone 101 (102).

DNS (Domain Name System) server 104 stores a DB that registers URIs (Uniform Resource Identifier) specified in NAPTR records and IP addresses corresponding to the URIs. DNS server 104 returns, to IP phone 101 (102), an IP address registered in the DB, in response to a query from IP phone 101 (102).

CA 105 controls a call connection with IP phone 101 (102) that is connected to IP network 106. CA 105 executes a call connection control with the destination IP phone 102 (101), in response to a call connection request from IP phone 101 (102) that has received a call.

Figure 2:
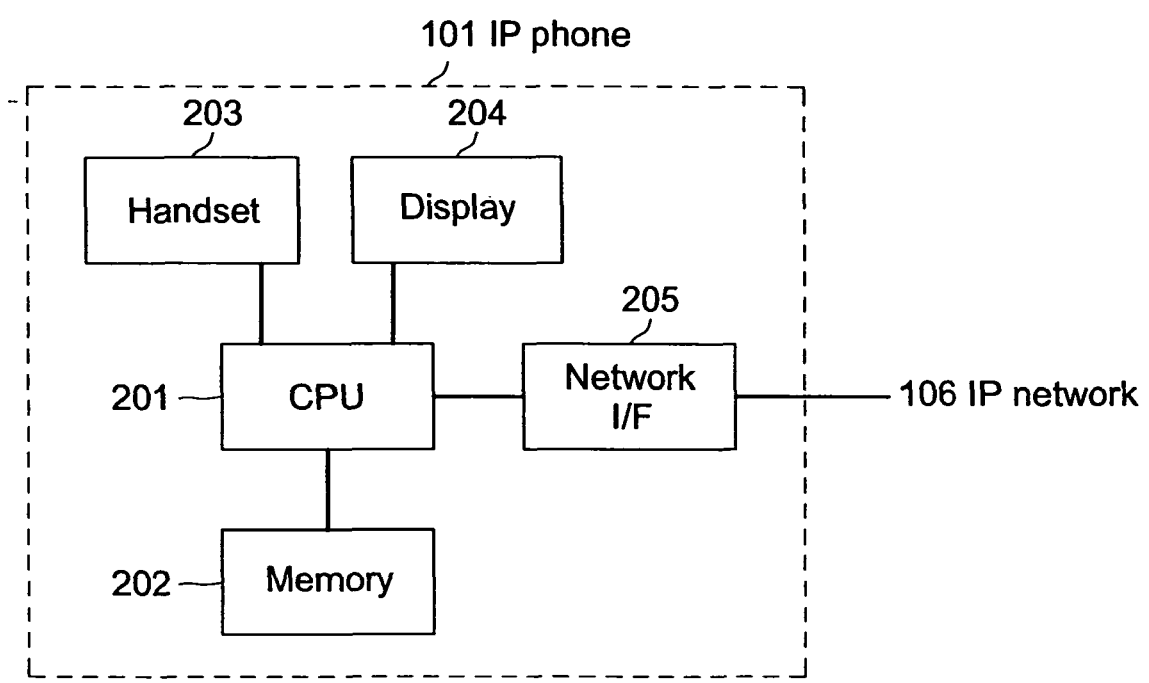
FIG. 2 illustrates a block diagram describing a configuration of an IP telephone apparatus according to the first embodiment of the present invention.

FIG. 2 illustrates a block diagram describing a configuration of IP phone 101 according to the first embodiment of the present invention. IP phone 102 has the same configuration as IP phone 101.

In FIG. 2, IP phone 101 mainly includes CPU 201, memory 202, handset 203, display 204 and network interface (hereafter referred to as "network I/F") 205.

CPU (Central Processing Unit) 201 controls all operations needed to perform voice communication with another IP phone 102 via IP network 106 based on a program for controlling voice communication, which is stored in memory 202. Therefore, CPU 201 executes a call control with the destination terminal according to call control protocols such as SIP (Session Initiation Protocol) or H.323. CPU 201 also provides necessary instructions to display 204 and network I/F 205. Also, CPU 201 transmits, to ENUM server 103, a request for querying a NAPTR record corresponding to the destination terminal (hereafter referred to as "ENUM query") and receives a response to the ENUM query (hereafter referred to as "ENUM response"). CPU 201 also transmits, to DNS server 104, a request for querying an IP address (hereafter referred to as "IP address query") and controls the reception of a response to the IP address query (hereafter referred to as "IP address response"). Also, CPU 201 functions as a controller.

Memory 202 has ROM (Read Only Memory) and RAM (Random Access Memory) functions. A ROM stores such programs as the program for controlling voice communication, which is executed by CPU 201. A RAM functions as a work memory when CPU 201 executes the control program.

Handset 203 outputs, to CPU 201, an off-hook or on-hook signal depending on the user's on-or-off hook operation. Handset 203 is configured with a microphone and a speaker. When starting communication with the destination terminal, handset 203 converts the user's transmitting voice into a transmitting voice signal through the microphone and outputs the signal to CPU 201. At the same time, handset 203 outputs, through the speaker, a receiving voice signal input by CPU 201, as a receiving voice.

Display 204 is configured with an LCD or the like. Display 204 displays the current status of IP phone 101 and displays telephone numbers or other information input by CPU 201.

Network I/F 205 is an interface with IP network 106 to which IP phone 101 is connected. Network I/F 205 functions as a transmitter or a receiver.

Figure 3:
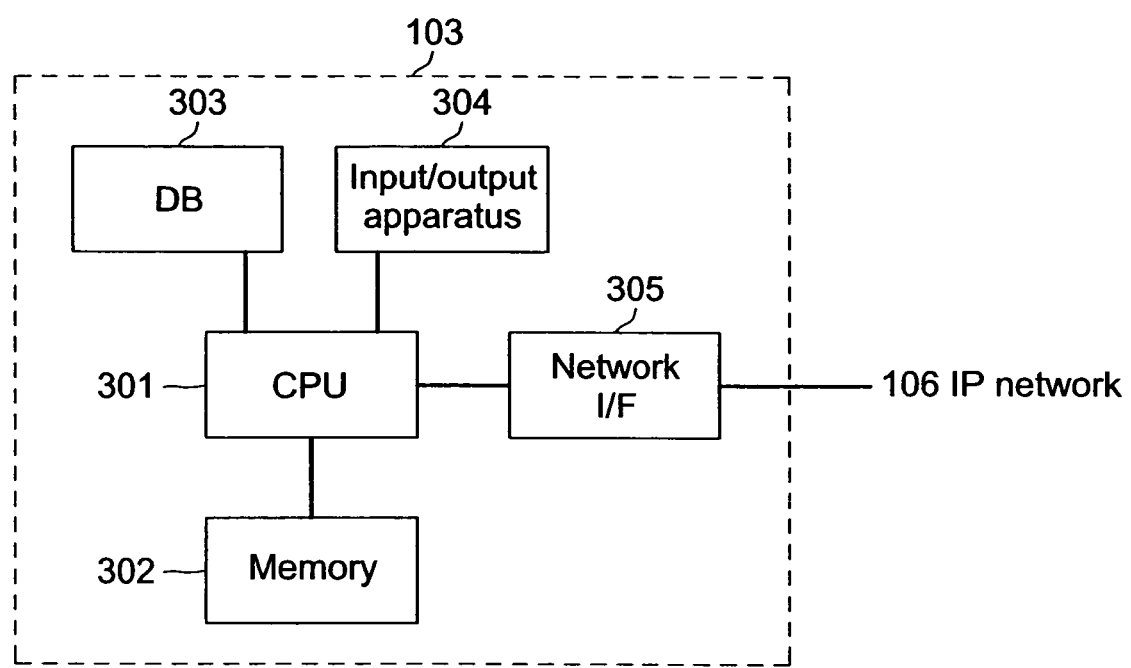
FIG. 3 illustrates a block diagram describing a configuration of an ENUM server according to the first embodiment of the present invention.

FIG. 3 illustrates a block diagram describing a configuration of ENUM server 103 according to the first embodiment of the present invention. In FIG. 3, ENUM server 103 mainly includes CPU 301, memory 302, DB 303, input/output apparatus 304 and network I/F 305.

CPU 301 controls the entire operation of ENUM server 103 based on the control program stored in memory 302. When receiving the ENUM query from IP phone 101, for example, CPU 301 searches for a NAPTR record corresponding to the ENUM query from the data stored in DB 303, which is later described, and returns the NAPTR record to IP phone 101 that has transmitted the ENUM query. CPU 301 functions as a controller.

Memory 302 has ROM and RAM functions. A ROM stores such programs as a control program executed by CPU 301. A RAM functions as a work memory when CPU 301 executes the control program.

DB 303 is configured with a hard disk apparatus and the like, and registers the above-noted NAPTR records. FIG. 4 illustrates an example of NAPTR records stored in DB 303 according to the first embodiment of the present invention. FIG. 4 shows a case where DB 303 stores NAPTR records corresponding to domain names obtained from telephone numbers "0310000000" and "0310000001".

Input/output device 304 is configured with an input device such as a key board and an output device such as a display. The input device is used for the maintenance of ENUM server 103. The output device is used to display maintenance information. Network I/F 305 is an interface with IP network 106 to which ENUM server 103 is connected. Network I/F 305 also functions as a transmitter or a receiver.

In FIG. 4, two URIs "05011112222@tokyo.sip.jp" and "//www.tokyo.sip.com/user0511112222.html" correspond to domain name "0.0.0.0.0.0.0.1.3.1.8.e164.arpa" obtained from telephone number "0310000000". The service field of the first URI specifies "E2U+sip", which indicates that the terminal specified by "0310000000" is able to perform the SIP protocol. The service field of the second URI specifies "E2U+http", which indicates that the terminal specified by "0310000000" is able to perform http (hypertext transfer protocol).

Also, two URIs "05033334444@tokyo.sip.jp" and "//www.tokyo.sip.com/user05033334444.html" correspond to domain name "1.0.0.0.0.0.0.1.3.1.8.e164.arpa" obtained from telephone number "0310000001". The service field of the first URI specifies "E2U+sip", which indicates that the terminal specified by "0310000001" is able to perform the SIP protocol. The service field of the second URI specifies "E2U+http", which indicates that the terminal specified by "0310000001" is able to perform http.

Telephone numbers "0310000000" and "0310000001" of the above-noted IP phone 101 and IP phone 102 are PSTN telephone numbers in the OABJ number system. "05011112222" and "05033334444" contained in the URIs are IP telephone numbers in the IP telephone number system. Therefore, the NAPTR records include the PSTN telephone numbers (OABJ numbers) and their corresponding IP telephone numbers which are assigned to IP phone 101 and IP phone 102.

FIG. 5 shows an example of data stored in a DB of DNS server 104 according to the first embodiment of the present invention.

FIG. 5 shows a case where the DB of DNS server 104 registers URIs "05011112222@tokyo.sip.jp", "05033334444@tokyo.sip.jp", "05055556666@tokyo.sip.jp" and "05077778888@tokyo.sip.jp". More specifically, IP addresses "192.168.1.1", "192.168.1.2", "192.168.1.3" and "192.168.1.4" respectively correspond to URIs "05011112222@tokyo.sip.jp", "05033334444@tokyo.sip.jp", "05055556666@tokyo.sip.jp" and "05077778888@tokyo.sip.jp".

Also, CA 105 stores a DB that registers the IP telephone numbers and users' information regarding IP telephone apparatuses that are connected to IP network 106 (IP phone 101 and IP phone 102 in this case). When a new IP phone is connected to IP network 106, CA 105 obtains the IP telephone number and the user's information regarding the IP phone and registers them in the DB.

Figure 6:
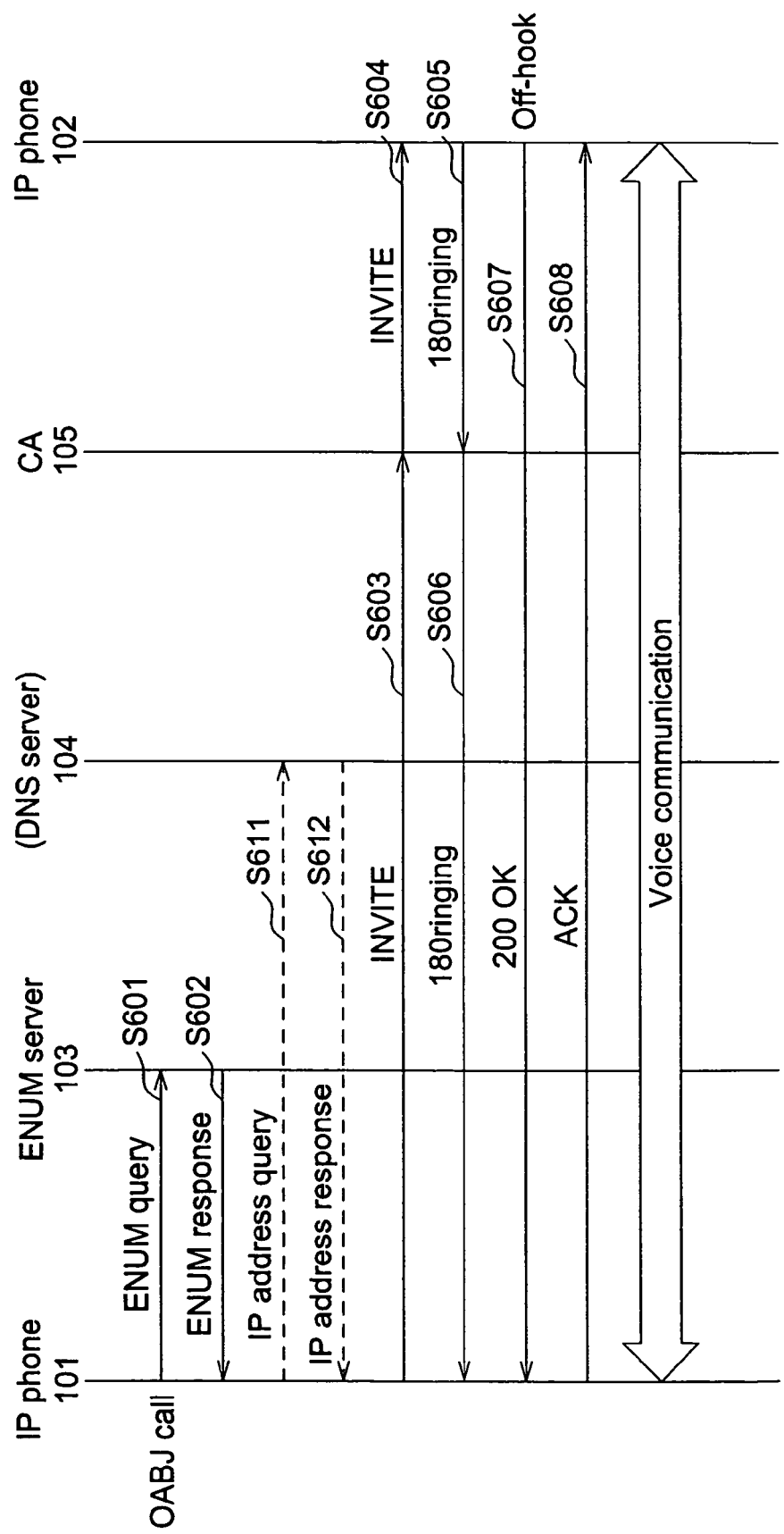
FIG. 6 illustrates a sequence diagram describing operations performed until a source IP telephone apparatus performs voice communication with a destination IP telephone apparatus in the IP telephone system according to the first embodiment of the present invention.

The following describes the operations until IP phone 101 performs voice communication with IP phone 102 in IP telephone system 100 in FIG. 1 with reference to the FIG. 6 sequence diagram.

In this illustration, DB 303 of ENUM server 103 stores the NAPTR records shown in FIG. 4, and the DB of DNS server 104 stores the data shown in FIG. 5. IP phone 101 and IP phone 102 have "0310000000" and "0310000001" as respective assigned PSTN (OABJ) telephone numbers, and have "05011112222" and "05033334444" as respective assigned IP telephone numbers beginning with "050", which indicates the IP telephone number system.

The FIG. 6 sequence diagram illustrates the operations starting from inputting the PSTN telephone number of IP phone 102 until the operator of IP phone 101 starts voice communication.

When IP phone 101 performs voice communication with IP phone 102, the operator of IP phone 101 first inputs the PSTN telephone number of IP phone 102, which is "0310000001", and IP phone 101 instructs to transmit the ENUM query.

Upon receiving the PSTN telephone number and then the ENUM query transmission instruction, CPU 201 of IP phone 101 transmits, from network I/F 205 to ENUM server 103, the ENUM query for a NAPTR record corresponding to the PSTN telephone number (Step S601). In this case, IP phone 101 first converts the operator's input PSTN telephone number "0310000001" into "+81-3-10000001" including the country code according to standard E. 164. Then, "+81310000001" is obtained, keeping + at the beginning and the numbers. Then, non numerical symbols are deleted, and dots are inserted between the numbers, resulting in "8.1.3.1.0.0.0.0.0.0.1". Next, the numbers are reversed, and data string ".e164.arpa" is added at the end. As a result, domain name "1.0.0.0.0.0.0.1.3.1.8. e164.arpa" is obtained. IP phone 101 then transmits, to ENUM server 103, the ENUM query for a NAPTR record corresponding to the data string.

Upon receiving the ENUM query from IP phone 101, ENUM server 103 searches for a NAPTR record corresponding to domain name "1.0.0.0.0.0.0.1.3.1.8. e164.arpa" from DB 303. ENUM server 103 then returns, to IP phone 101, the ENUM response including the corresponding NAPTR record (Step S602). In this case, ENUM server 103 retrieves the bottom NAPTR record among the NAPTR records shown in FIG. 4 and returns, to IP phone 101, the ENUM response including the NAPTR record. By returning the ENUM response to IP phone 101, IP phone 101 is notified that the IP telephone number of IP phone 102 is "05033334444", and that IP phone 102 is able to perform the SIP protocol as well as the https protocol.

Next, when IP phone 101 receives, from ENUM server 103, the ENUM response including the NAPTR record, CPU 201 retrieves "05033334444" from "05033334444@tokyo.sip.jp" specified in the NAPTR record, which indicates that the terminal specified by "05033334444" is able to perform the SIP protocol. CPU 201 then confirms the IP telephone number of IP phone 102. IP phone 101 then transmits, from network I/F 205 to CA 105, the "INVITE" message in which IP telephone number "05033334444" is set.

The following describes an example of how the "INVITE" message is set up with reference to FIG. 7. The "INVITE" message includes header "From" in the third line and header "To" in the forth line. Header "From" contains information including the IP telephone number of the source IP phone 101, which is "05011112222". Header "To" contains information including the IP telephone number of the destination IP phone 102, which is "05033334444".

Particularly, in the example shown in FIG. 7, @ is contained in header "From" and header "To". Before @ (to the left side of @ in the figure), the IP telephone numbers of the source and destination IP phones are described. Information contained in header "From" and header "To" is not limited to the example shown in FIG. 7.

Upon receiving the "INVITE" message from IP phone 101, CA 105 retrieves, from header "To" in the "INVITE" message, the IP telephone number of the destination IP phone 102. In this case, "05033334444" described before @ is retrieved from header "To" shown in FIG. 7 as the IP telephone number of the destination IP phone 102.

CA 105 then transmits, to the destination IP phone 102, the "INVITE" message received from IP phone 101 (Step S604). Upon receiving the "INVITE" message from CA 105, IP phone 102 sounds a receiving tone to notify the operator of a call. At the same time, IP phone 102 transmits the "180 ringing" message to CA 105 (Step S605). CA 105 transmits, to the destination IP phone 101, the "180 ringing" message received from IP phone 102 (Step S606).

When IP phone 101 receives the "180 ringing" message from IP phone 102, the operator is informed, through a ring back tone sounded by the handset 203 speaker, that the call is being made to the destination IP phone 102. When the operator's off-hook condition of handset 203 is detected at the destination IP phone 102, the "200 OK" message indicating a connection approval is transmitted from IP phone 102 to IP phone 101 (Step S607).

Upon receiving the "200 OK" message from IP phone 102, IP phone 101 transmits the "ACK" message to IP phone 102 (Step S608). When IP phone 102 receives the "ACK" message from IP phone 101, voice communication becomes possible between IP phone 101 and IP phone 102.

In the FIG. 6 sequence diagram, the dotted lines indicate the process of transmitting a query to DNS server 104, when IP phone 101 needs to inquire an IP address corresponding to a URI in order to access CA 105. In this case, IP phone 101 transmits, to DNS server 104, the IP address query for "05033334444@tokyo.sip.jp" specified in the NAPTR record, which is included in the ENUM response received from ENUM server 103 (Step S611).

Upon receiving the IP address query from IP phone 101, DNS server 104 searches for the IP address corresponding to the URI and returns, to IP phone 101, the IP address response including the IP address (Step S612). In this case, DNS server 104 retrieves the second top IP address (192.168.1.2) among the data in the DB shown in FIG. 5 and returns, to IP phone 101, the IP address response including the IP address.

Upon receiving the IP address response from DNS server 104, IP phone 101 confirms the IP address assigned to IP phone 102 and transmits the "INVITE" message to the IP address destination. The process thereafter is the same as above.

Figure 8:
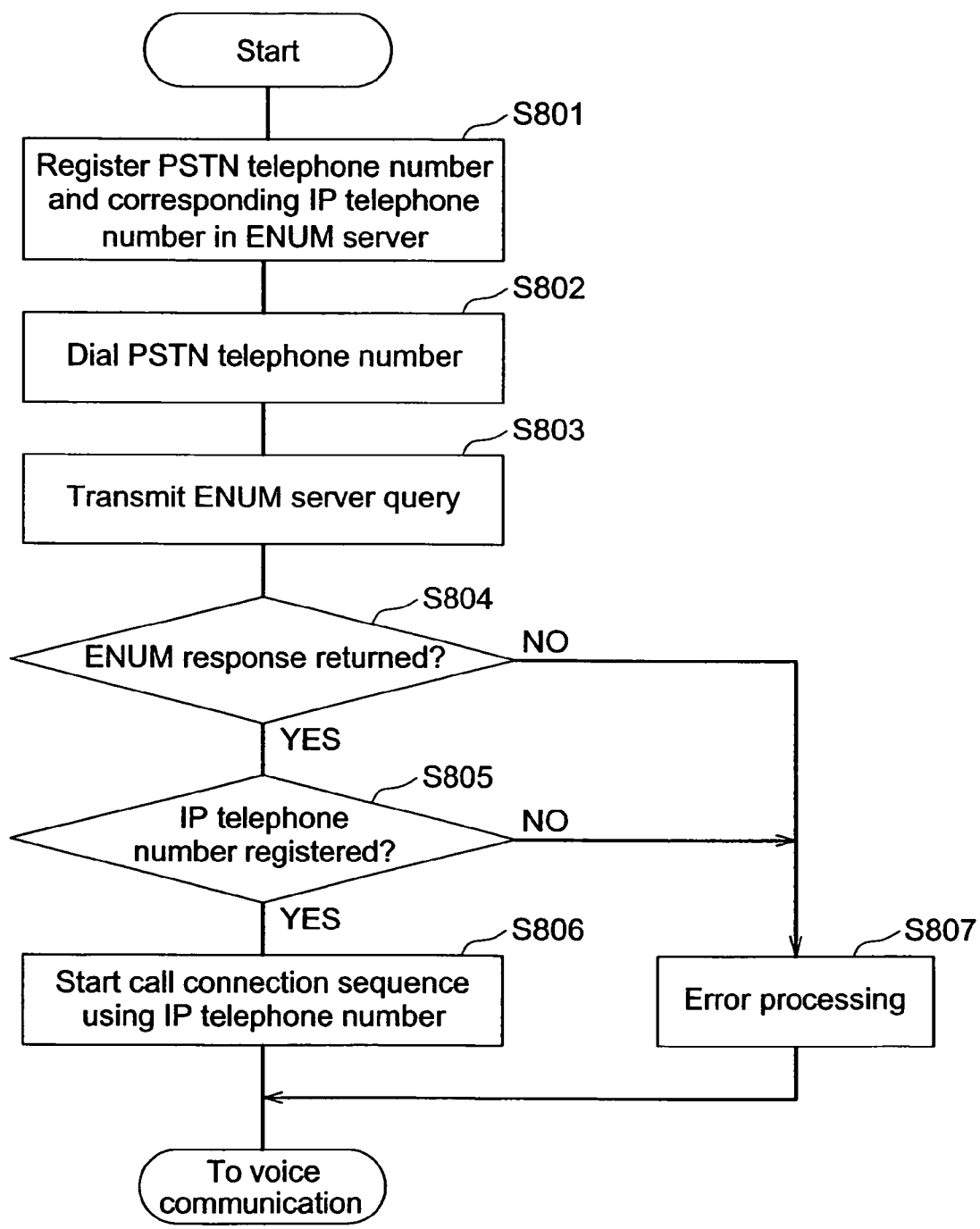
FIG. 8 illustrates a flow chart describing an operation of the source IP telephone apparatus in the FIG. 6 sequence.

The following describes an operation of IP phone 101 shown in the FIG. 6 sequence diagram with reference to the FIG. 8 flow chart.

ENUM server 103 stores the NAPTR records including the PSTN telephone numbers and their corresponding IP telephone numbers of IP phone 101 and IP phone 102 shown in FIG. 4 (Step S801). When the PSTN telephone number of IP phone 102, "0310000001", is input by the operator, and an instruction for transmitting the ENUM query is made (ST S802), IP phone 101 transmits, from I/F 205 to ENUM server 103, the ENUM query for a NAPTR record corresponding to the PSTN telephone number (Step S803).

Next, IP phone 101 waits for the ENUM response to be returned from ENUM server 103 in response to the ENUM query (Step S804). When the ENUM response is received (Step S804: YES), the process proceeds to Step S805 to determine whether the IP telephone number of IP phone 102 is registered, according to the NAPTR record in the received ENUM response.

When IP phone 101 determines that the IP telephone number of IP phone 102 is registered in the NAPTR record (Step S805: YES), the process proceeds to Step S806 to start a call connection sequence between IP phone 101 and IP phone 102 via CA 105, using the IP telephone number retrieved from the NAPTR record.

On the other hand, when IP phone 101 determines that there is no ENUM response at Step S804 (Step S804: NO) or determines that the IP telephone number of IP phone 102 is not registered in the NAPTR record received at Step S805 (Step S805: NO), the process proceeds to Step S807 for error processing.

Also, when IP phone 101 needs to inquire an IP address corresponding to a URI in order to access CA 105, IP phone 101 executes a process to DNS server 104 between the above-noted steps S805 and S806. The process executed to DNS 104 is described in the following (not shown in FIG. 7).

When IP phone 101 needs to inquire an IP address corresponding to a URI in order to access CA 105, IP phone 101 transmits, to DNS server 104, an IP address query regarding CA 105.

IP phone 101 then waits for the IP address response regarding CA 105 to be returned from DNS server 104. Upon receiving the IP address response, IP phone 101 starts the call connection sequence with IP phone 102 via CA 105.

When the IP address response is not received from DNS server 104, IP phone 101 executes the error processing at the above-noted step S807.

As described above, in IP telephone system 100 according to the first embodiment of the present invention, DB 303 of ENUM server 103 stores the NAPTR records registering the PSTN telephone numbers (OABJ numbers) and their corresponding IP telephone numbers of IP phone 101 and IP phone 102. ENUM server receives, from the source IP phone 101, the ENUM query that sets the domain name obtained from the PSTN telephone number. Upon receiving the ENUM query, ENUM server 103 searches for a NAPTR record corresponding to the domain name from DB 303 and returns, to IP phone 101, the ENUM response including the NAPTR record. Upon receiving the ENUM response from ENUM server 103, IP phone 101 retrieves the IP telephone number of the destination IP phone 102, the IP telephone number being specified in the NAPTR record, which is included in the ENUM response, and starts the call connection sequence with IP phone 102 via CA 105.

Therefore, the operator of the source IP phone 101 can automatically start a call operation using the IP telephone number with the destination IP phone 102 by transmitting ENUM requests to and receiving ENUM responses from ENUM server 103, even when the operator of IP phone 101 does not know the IP telephone number of the destination IP phone 102. As a result, the operator of IP phone 101 does not need to remember both the PSTN telephone number and the IP telephone number of IP phone 102. The operator needs only to register the PSTN telephone number in the phonebook, which reduces the workload for the operator.

The first embodiment of the present invention describes cases where IP phone 101 places a call to IP phone 102. The above-noted sequence and flow may apply to cases where IP phone 102 places a call to IP phone 101.

Second Embodiment

In the second embodiment of the present invention, a description is provided regarding an IP telephone system that executes a call connection sequence between IP telephone apparatuses that can be connected to both the PSTN and the IP network. In the IP telephone system, it is possible to execute the call connection sequence via the PSTN when no call connection can be established with the IP telephone apparatus via the IP network.

Figure 9:
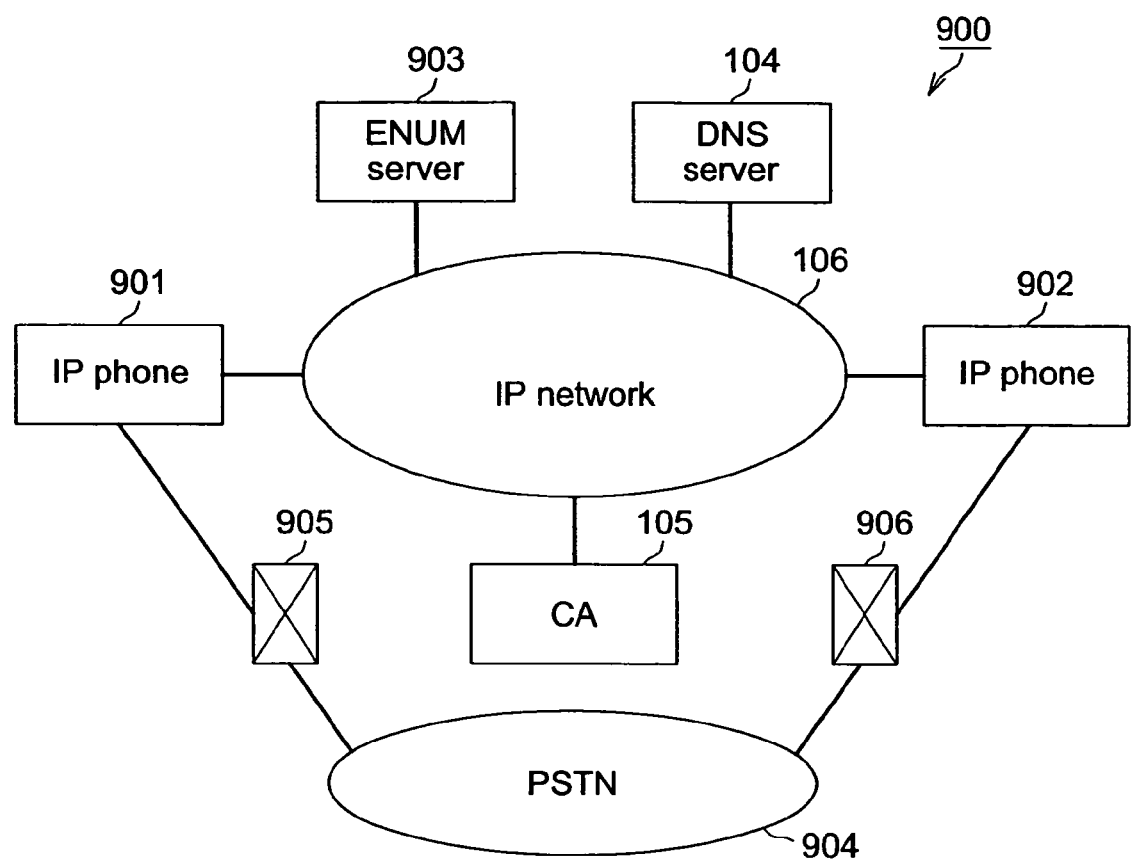
FIG. 9 illustrates a configuration of an IP telephone system according to the second embodiment of the present invention.

FIG. 9 shows the entire configuration of IP telephone system 900 according to the second embodiment of the present invention. In FIG. 9, components identical to those used in IP telephone system 100 shown in the above-described FIG. 1 are indicated by the same numbers, and their descriptions are therefore omitted.

IP telephone system 900 shown in FIG. 9 differs from IP telephone system 100 shown in FIG. 1 in that IP phone 901 (902) is connected to PSTN 904 via switchboard 905 (906), and that ENUM server 903 has different functions.

Figure 10:
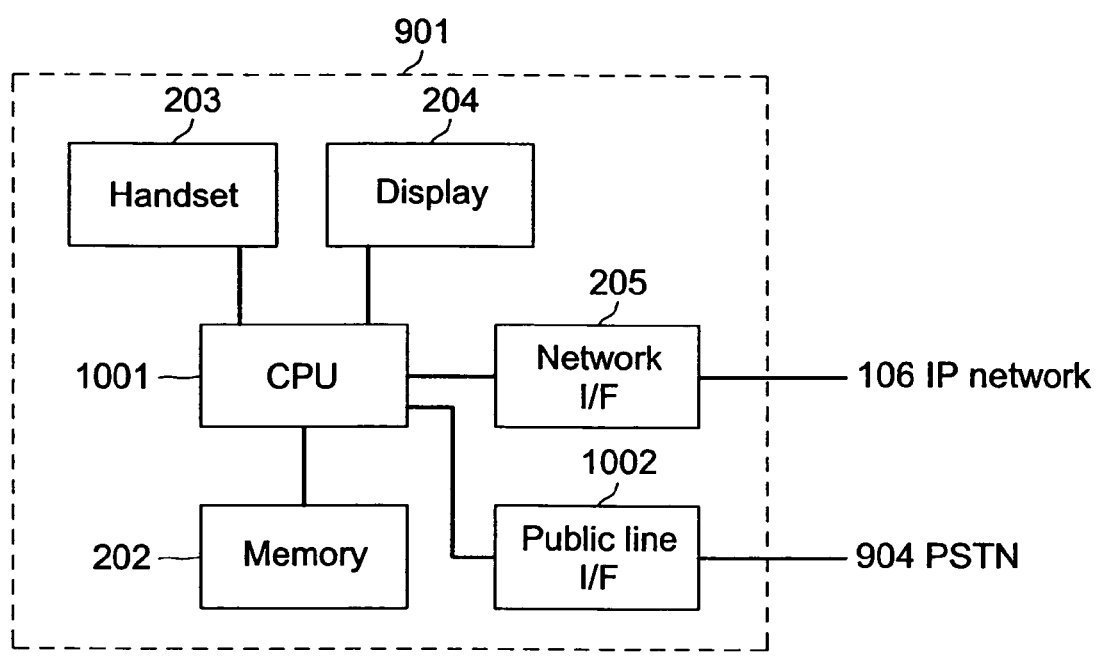
FIG. 10 illustrates a block diagram describing a configuration of an IP telephone apparatus according to the second embodiment of the present invention.

FIG. 10 illustrates a block diagram describing a configuration of IP phone 901 according to the second embodiment of the present invention. In FIG. 10, components identical to those of IP phone 101 shown in the above-described FIG. 2 are indicated by the same numbers, and their descriptions are therefore omitted. Also, IP phone 902 has the same configuration as IP phone 901.

IP phone 901 shown in FIG. 10 differs from IP phone 101 shown in FIG. 2 in that CPU 1001 has different functions, and that public line I/F 1002 is added to connect IP phone 901 to PSTN 904.

CPU 1001 controls all the operations needed to perform voice communication with another IP phone 902 via IP network 106 based on a program for controlling voice communication, the program corresponding to the IP network and being stored in memory 202. Therefore, CPU 1001 executes a call control with the destination terminal according to call control protocols such as SIP (Session Initiation Protocol) or H.323. CPU 1001 also provides necessary instructions to display 204, network I/F 205 and public line I/F 1002. Also, CPU 1001 transmits, to ENUM server 903, a request for querying a NAPTR record corresponding to the destination terminal (hereafter referred to as "ENUM query") and receives a response to the ENUM query (hereafter referred to as "ENUM response"). CPU 1001 also transmits, to DNS server 104, a request for querying an IP address (hereafter referred to as "IP address query") and controls the reception of a response to the IP address query (hereafter referred to as "IP address response").

CPU 1001 controls all operations needed to perform voice communication with another IP phone 902 via PSTN 904 based on a program for controlling voice communication, the program corresponding to the PSTN and being stored in memory 202.

Public line I/F 1002 has a modem function as an interface with PSTN 904 to which IP phone 901 is connected. Public line I/F 1002 also has a function which connects and disconnects lines with switchboard 905. Public line I/F 1002 has a function which sets communication with switchboard 906 to which the destination IP phone 902 is connected, after the call connection is established.

Upon receiving, from IP phone 901, the PSTN telephone number of the destination IP phone 902, switchboard 905 executes the call connection sequence with switchboard 906 to which the destination terminal is connected via PSTN 904. At the same time, switchboard 905 monitors voice communication after the call connection is established and executes a call disconnection process.

Figure 11:
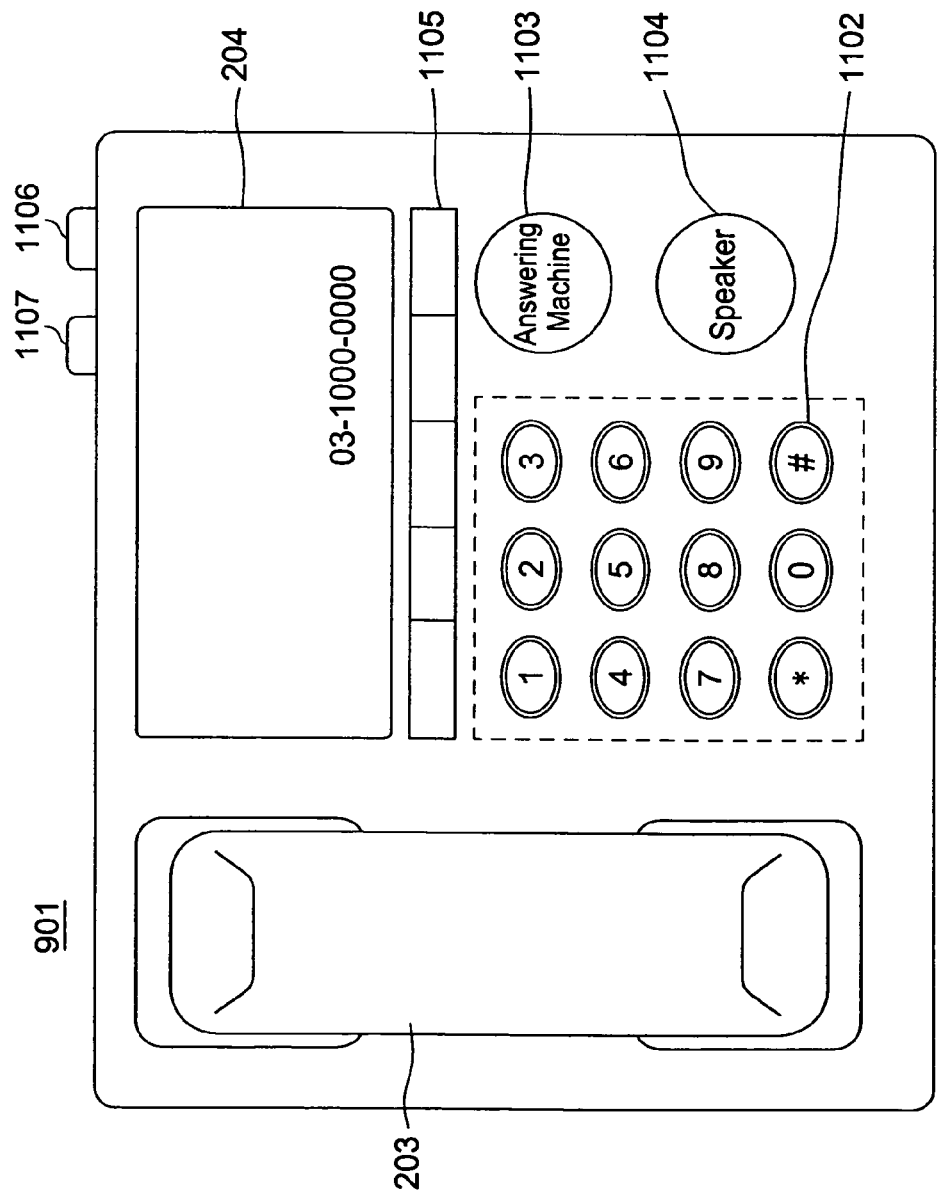
FIG. 11 illustrates the external front view of the IP telephone apparatus in FIG. 10.

FIG. 11 shows the external front view of IP phone 901. IP phone 902 has the same configuration as IP phone 901.

In FIG. 11, IP phone 901 includes a microphone, handset 203, numeric keys 1102, answering machine button 1103, speaker button 1104 and function button 1105. The microphone is used to receive the operator's voice. Handset 203 has a speaker to output the received voice. Numeric keys 1102 is used to input telephone numbers and the like. Answering machine button 1103 is used to switch to answering machine mode. Function button 1105 can set various functions such as a single touch transmission function. IP phone 901 further includes, on its sides, LAN interface (LAN I/F) 1106 and public line interface (public line I/F) 1107. LAN interface (LAN I/F) 1106 is connected to IP network 106. Public line interface (public line I/F) 1107 is connected to PSTN 904.

Also, display 204 is configured with an LCD or the like. Display 204 is placed above function button 1105. Display 204 can display callers' telephone numbers received from ENUM server 903. Display 204 also can display callers' names or other information registered in the phonebook corresponding to callers' telephone numbers.

FIG. 12 shows an example of NAPTR records stored in DB 303 of ENUM server 903. FIG. 12 shows a case where DB 303 stores NAPTR records corresponding to domain names obtained from IP telephone numbers "05011112222" and "05033334444".

In FIG. 12, URI scheme "sip: 05011112222@tokyo.sip.jp" corresponds to domain name "2.2.2.2.1.1.1.1.0.5.0.e164.arpa" obtained from IP telephone number "05011112222". The same service field specifies "E2U+sip", which indicates that the terminal specified by "05011112222" corresponds to an IP phone.

Furthermore, URI scheme "tel: 81310000000; svc=voice" corresponds to the same domain name "2.2.2.2.1.1.1.1.0.5.0.e164.arpa". The same service field specifies "E2U+voice: tel", which indicates that the destination terminal corresponds to a PSTN telephone. "E2U+sip" in the same service field relates to "Order=100". "E2U+voice: tel" in the same service field relates to "Order=200". Order value indicates the priority of the service.

In FIG. 12, URI scheme "sip: 05033334444@tokyo.mail.com" corresponds to domain name "4.4.4.4.3.3.3.3.0.5.0.e164.arpa" obtained from IP telephone number "05033334444". The same service field specifies "E2U+sip," which indicates that the terminal specified by "05033334444" corresponds to an IP phone.

Furthermore, URI scheme "tel: 81310000001; svc=voice" corresponds to the same domain name "4.4.4.4.3.3.3.3.0.5.0.e164.arpa". The same service field specifies "E2U+voice: tel", which indicates that the destination terminal corresponds to a PSTN telephone. "E2U+sip" in the same service field relates to "Order=100". "E2U+voice: tel" in the same service field relates to "Order=200". Order value indicates the priority of the service.

Telephone numbers "05011112222" and "05033334444" of the above-noted IP phone 901 and IP phone 902 are IP telephone numbers. PSTN telephone numbers "0310000000" and "0310000001" contained in the URIs are OABJ system telephone numbers. Therefore, the NAPTR records include the PSTN telephone numbers (OABJ numbers) and their corresponding IP telephone numbers which are assigned to IP phone 901 and IP phone 902.

When receiving the ENUM query from IP phone 901, the query setting the domain name obtained from the IP telephone number of the destination IP phone 902, ENUM server 903 searches for a corresponding NAPTR record among the NAPTR records shown in FIG. 12 and returns, to IP phone 901, the ENUM response including the NAPTR record.

Figure 13:
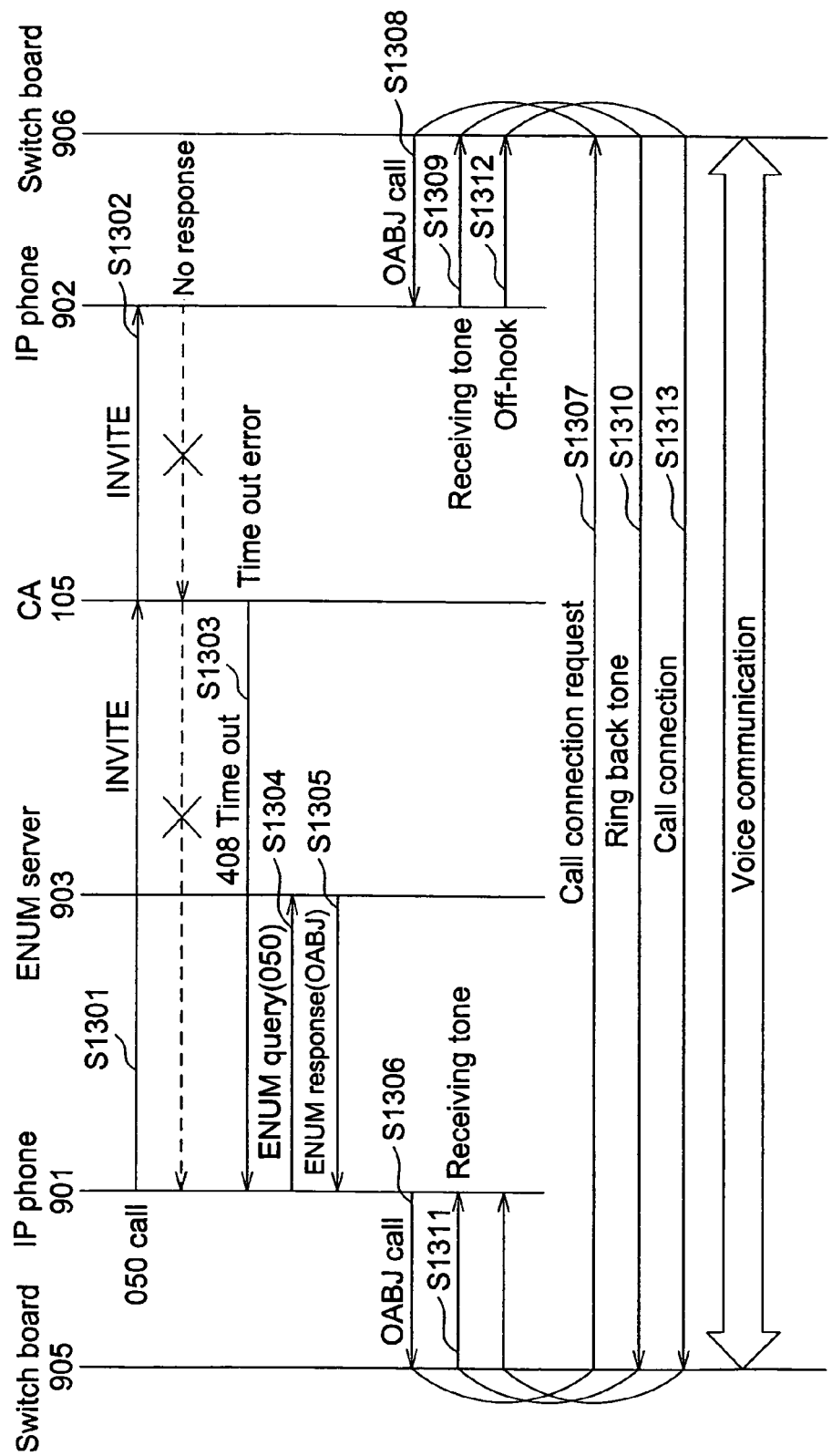
FIG. 13 illustrates a sequence diagram describing operations until a source IP telephone apparatus performs voice communication with a destination IP telephone apparatus in an IP telephone system according to the second embodiment of the present invention.

The following describes the operations until IP phone 901 performs voice communication with IP phone 902 in IP telephone system 900 shown in FIG. 9 with reference to the FIG. 13 sequence diagram.

In this illustration, DB 303 of ENUM server 903 stores the NAPTR records shown in FIG. 12. IP phone 901 and IP phone 902 have "0310000000" and "0310000001" as respective assigned PSTN (OABJ) telephone numbers, and have "05011112222" and "05033334444" as respective assigned IP telephone numbers beginning with "050", which indicates the IP telephone number system.

The FIG. 13 sequence diagram illustrates the operations starting from inputting the IP telephone number of IP phone 902 until the operator of IP phone 901 starts voice communication.

When IP phone 901 performs voice communication with IP phone 902, the operator of IP phone 901 first inputs the IP telephone number of IP phone 902, which is "05033334444". IP phone 901 then transmits, from network I/F 205 to CA 105, the "INVITE" message, which sets IP telephone number "05033334444" (Step S1301).

The following describes an example of how the "INVITE" message is set up with reference to FIG. 7. The "INVITE" message includes header "From" on the third line and header "To" on the forth line. Header "From" contains information including the IP telephone number of the source IP phone 901, which is "05011112222". Header "To" contains information including the IP telephone number of the destination IP phone 902, which is "05033334444".

Particularly, in the example shown in FIG. 7, @ is contained in header "From" and header "To". Before @ (to the left side of @ in the figure), the IP telephone numbers of the source and destination IP phones are described. Information contained in header "From" and header "To" is not limited to the example shown in FIG. 7.

Upon receiving the "INVITE" message from IP phone 901, CA 105 retrieves, from header "To" in the "INVITE" message, the IP telephone number of the destination IP phone 902. In this case, "05033334444" described before @ is retrieved from header "To" shown in FIG. 7 as the IP telephone number of the destination IP phone 902.

CA 105 then transmits, to the destination IP phone 902, the "INVITE" message received from IP phone 901 (Step S1302). In the second embodiment of the present invention, FIG. 13 shows a case where an error occurred in IP network 106, or there was a failure in network I/F 205 of IP phone 902, resulting in no response returned to IP phone 901 in response to the "INVITE" message.

Then, CA 105 starts a timer that waits for a response from IP phone 902. When a time out error occurs, CA 105 returns the "408 timeout" message to IP phone 901 (Step S1303). There is another CA that does not control time out. In this case, a response signal to the "INVITE" message does not reach IP phone 901 from another CA.

When IP phone 901 determines that the "408 timeout" message is received or that the "INVITE" response signal is not returned from CA 105, the ENUM query is transmitted, from network I/F 205 to ENUM server 903, for a NAPTR record corresponding to the IP telephone number of IP phone 902, which is "05033334444" (Step S1304). In this case, IP phone 901 obtains domain name "4.4.4.4.3.3.3.3.0.5.0.e164.arpa" corresponding to IP telephone number "05033334444" according to the same manners as described in the first embodiment. IP phone 901 then transmits, to ENUM server 903, the ENUM query for a NAPTR record corresponding to the data string.

When receiving the ENUM query from IP phone 901, ENUM server 903 searches for a NAPTR record corresponding to domain name "4.4.4.4.3.3.3.3.0.5.0.e164.arpa" from DB 303 and returns, to IP phone 901, the ENUM response including the corresponding NAPTR record (Step S1305).

When receiving, from ENUM server 903, the ENUM response including the NAPTR record, IP phone 901 chooses the NAPTR record having the highest order value (the lowest priority) and indicating the destination terminal corresponds to a PSTN telephone. IP phone 901 then retrieves "0310000001" from the specified "tel: 81310000001; svc=voice" by excluding country code 81 and adding 0, and obtains the PSTN telephone number of IP phone 902. IP phone 901 then places a call, from public line I/F 1002 to switchboard 905, using the PSTN telephone number (0310000001) (Step S1306).

When receiving, from IP phone 901, the PSTN telephone number of IP phone 902, "0310000001", switchboard 905 transmits a call connection request to switchboard 906 to which IP phone 902 is connected via PSTN 904 (Step S1307). When receiving the call connection request from switchboard 905, switchboard 906 transmits a receiving signal to IP phone 902 (Step S1308). When receiving the receiving signal from switchboard 906, IP phone 902 sounds a receiving tone to notify the operator of a call. At the same time, IP phone 902 transmits a ring back tone to switchboard 906 (Step S1309). Switchboard 906 transmits, to switchboard 905, the ring back tone signal received from IP phone 902 (Step S1310).

Switchboard 905 transmits, to IP phone 901, the ring back tone signal received from switchboard 906 (Step S1311). Through the handset 203 speaker, IP phone 901 lets the operator hear the receiving tone from IP phone 902, using a ring back tone signal received from switchboard 905.

When the operator's off-hook operation of handset 203 is detected, IP phone 902 transmits an off-hook signal to switchboard 906 (Step S1312). When receiving the off-hook signal from IP phone 902, switchboard 906 completes the call connection with IP phone 901 that is connected to switchboard 905 (Step S1313). The completion of this call connection enables voice communication, via PSTN 904, between IP phone 901 and IP phone 902.

As described above, in IP telephone system 900 according to the second embodiment of the present invention, DB 303 of ENUM server 903 stores the NAPTR records including the PSTN telephone numbers (OABJ numbers) and their corresponding IP telephone numbers of IP phone 901 and IP phone 902. In the call connection sequence performed between IP phone 901 and IP phone 902 that can be connected to both the PSTN and the IP network, the source IP phone 901 transmits, to ENUM server 903, the ENUM query that sets the domain name obtained from the IP telephone number of the destination IP phone 901, when no call connection can be established with IP phone 902 via IP network 106. ENUM server 903 then searches for a NAPTR record corresponding to the domain name included in the ENUM query received from IP phone 901 and returns, to IP phone 901, the ENUM response including the NAPTR record. IP phone 901 retrieves, from the NAPTR record included in the ENUM response returned from ENUM server 903, the PSTN telephone number of the destination IP phone 902. IP phone 901 then places a call to IP phone 902 via PSTN 904 using the PSTN telephone number.

Therefore, in the call connection sequence performed between IP telephone apparatuses that can be connected to both the PSTN and the IP network, when no call connection can be established via IP network 106, the process is automatically switched to the PSTN telephone call operation. This relieves the operator of the chore of dialing another telephone number. The IP telephone apparatus can be configured to have a function which informs the operator, through sound and light, when a switch is made from a free IP telephone call to a pay-as-you-go rate public network (PSTN telephone call).

The following describes a call connection sequence in cases where display apparatus 204 displays information regarding the caller of the source IP phone (the PSTN telephone number and the caller's name registered in the internal phonebook.

Figure 14:
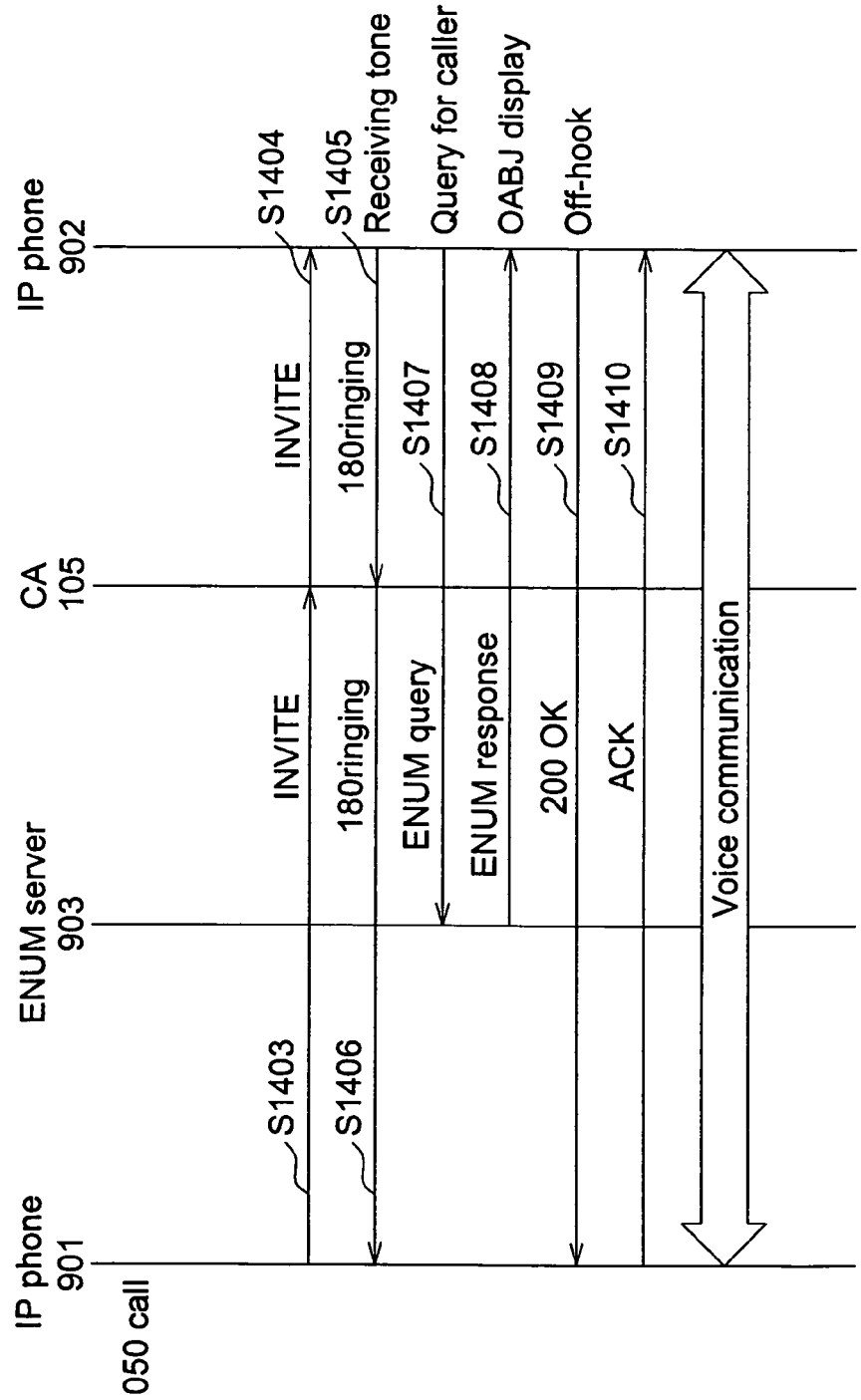
FIG. 14 illustrates a sequence diagram describing other operations until the source IP telephone apparatus performs voice communication with the destination IP telephone apparatus in the IP telephone system according to the second embodiment of the present invention.

The following describes the operations until IP phone 901 performs IP communication with IP phone 902 in IP telephone system 900 shown in FIG. 9 with reference to the FIG. 14 sequence diagram.

In this illustration, DB 303 of ENUM server 903 stores the NAPTR records shown in FIG. 12. Also, IP phone 901 and IP phone 902 have "0310000000" and "0310000001" as respective assigned PSTN (OABJ) telephone numbers, and have "05011112222" and "05033334444" as respective assigned IP telephone numbers beginning with "050", which indicates the IP telephone number system.

The FIG. 14 sequence diagram illustrates the operations starting from inputting the IP telephone number of IP phone 902 until the operator of IP phone 901 starts voice communication.

When IP phone 901 performs voice communication with IP phone 902, the operator of IP phone 901 first inputs the IP telephone number of IP phone 902, which is "05033334444".

IP phone 901 then transmits, from network I/F 205 to CA 105, the "INVITE" message according to the input IP telephone number (Step S1403).

The following describes an example of how the "INVITE" message is set up with reference to FIG. 7. The "INVITE" message includes header "From" in the third line and header "To" in the forth line. Header "From" contains information including the IP telephone number of the source IP phone 901, which is "05011112222". Header "To" contains information including the IP telephone number of the destination IP phone 902, which is "05033334444".

Particularly, in the example shown in the figure, @ is contained in header "From" and header "To". Before @ (to the left side of @ in the figure), the IP telephone numbers of the source and destination IP telephones are described. Information contained in header "From" and header "To" is not limited to the example shown in the same figure.

Upon receiving the "INVITE" message from IP phone 901, CA 105 retrieves, from header "To" shown in FIG. 7, the IP telephone number of the destination IP phone 902. In this case, "05033334444" described before @ is retrieved from header "To" in the "INVITE" message as the IP telephone number of the destination IP phone 902.

CA 105 then transmits, to the destination IP phone 902, the "INVITE" message received from IP phone 901 (Step S1404). Upon receiving the "INVITE" message from CA 105, IP phone 902 sounds a receiving tone to notify the operator of a call. At the same time, IP phone 902 transmits the "180 ringing" message to CA 105 (Step S1405). CA 105 then transmits, to the destination IP phone 901, the "180 ringing" message received from IP phone 902 (Step S1406).

When receiving the "180 ringing" message from IP phone 902, IP phone 901 sounds a ring back tone, through the handset 203 speaker, and informs the operator that the call is being made to the destination IP phone 902.

Next, IP phone 902 retrieves, from header "From" in the received "INVITE" message, the IP telephone number of the source IP phone 901, which is "05011112222". In the same manners as described in the first embodiment of the present invention, IP phone 902 obtains domain name "2.2.2.2.1.1.1.1.0.5.0.e164.arpa" corresponding to IP telephone number "05011112222". IP phone 902 then transmits, to ENUM server 903, the ENUM query for a NAPTR record corresponding to this data string (Step S1407).

Upon receiving the ENUM query from IP phone 902, ENUM server 903 searches for a NAPTR record corresponding to domain name "2.2.2.2.1.1.1.1.0.5.0.e164.arpa" from DB 303. ENUM server 903 then returns, to IP phone 902, the ENUM response including the retrieved NAPTR record (Step S1408). In this case, ENUM server 903 retrieves the top NAPTR record among the NAPTR records shown in FIG. 12 and returns, to IP phone 902, the ENUM response including the NAPTR record. By returning the ENUM response to IP phone 902, IP phone 902 is informed that the PSTN telephone number of IP phone 901 is "0310000000".

Next, when IP phone 902 receives, from ENUM server 903, the ENUM response including the NAPTR record, IP phone 901 retrieves the PSTN telephone number of IP phone 901, which is "03010000000", and displays the telephone number on display 204. A display example for this number is shown on display 204 in FIG. 11. By checking the display, the operator of IP phone 902 can identify the caller and determine whether to respond to the call. Also, when PSTN telephone numbers are registered in the phonebook, callers' name registered in the phonebook can be displayed on display 204.

When the operator's off-hook operation of handset 203 is detected at the destination IP phone 902, the "200 OK" message is transmitted to IP phone 901. The "200 OK" message indicates a connection approval (Step S1409).

When receiving the "200 OK" message from IP phone 902, IP phone 901 transmits the "ACK" message to IP phone 902 (Step S1410). When IP phone 902 receives the "ACK" message from IP phone 901, voice communication becomes possible between IP phone 901 and IP phone 902.

As described above, even when IP phone 901 performs the IP telephone number call, the destination IP phone 902 obtains, from ENUM server 903, the PSTN telephone number of the source telephone apparatus and displays the obtained PSTN telephone number on the telephone apparatus at the reception of the call. Therefore, the operator of the destination IP phone 902 does not need to remember the IP telephone number of the source IP phone 901. Also, as long as PSTN telephone numbers are registered in the phonebook, it is possible to identify the caller by the caller's name registered in the internal phonebook.

Therefore, the operator of the destination IP phone 902 is able to decide whether to perform the off-hook operation after identifying the caller by the displayed PSTN telephone number or the name. This blocks calls from unknown parties.

Display 204 is configured to display the PSTN telephone number assigned to the source IP phone 901 and the caller's name registered in the phone book. Therefore, the operator of IP phone 902 is able to identify the caller more easily than by checking the displayed IP telephone number. This function only requires that PSTN telephone numbers be registered in the phonebook, and thus reduces the workload for operators.

In the second embodiment of the above-described present invention, descriptions were provided regarding cases where IP phone 901 places a call to IP phone 902. The above-described sequence and communication flow may apply to cases where IP phone 902 places a call to IP phone 901.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. P2004-190384 filed on Jun. 28, 2004 entire content of which is expressly incorporated by reference herein.

What is claimed is:

1. A called IP telephone apparatus connected to an ENUM server and to a call agent apparatus, the ENUM server storing a NAPTR (Naming Authority Pointer) resource record, the NAPTR resource record including a URI corresponding to an ENUM domain name, the call agent apparatus controlling a connection between the called IP apparatus and a calling IP telephone apparatus, the called IP telephone apparatus comprising:
   a display configured to display data;
   an Interface configured to receive an INVITE message from the call agent apparatus, the INVITE message including an IP telephone number of the calling IP telephone apparatus, the IP telephone number being utilizable for making a call via the Internet;
a phonebook including PSTN telephone numbers respectively associated with caller's names; and
a controller configured to;
sound a ringing tone at the called IP telephone apparatus to alert a user of the called IP telephone apparatus, upon receiving the INVITE message;
extract the IP telephone number of the calling IP telephone apparatus from the INVITE message while sounding the ringing tone;
transmit, while sounding the ringing tone, to the ENUM server, a request for transmitting, to the called IP telephone apparatus, the NAPTR resource record corresponding to an ENUM domain name obtained from the IP telephone number of the calling IP telephone apparatus in the INVITE message, when the Interface receives the INVITE message, the corresponding NAPTR resource record including the URI, the URI including a PSTN (Public Switched Telephone Networks) telephone number of the calling IP telephone apparatus, the PSTN telephone number being utilizable for making a call via a PSTN and being distinct from the IP telephone number;
receive the corresponding NAPTR resource record from the ENUM server, while sounding the ringing tone;
retrieve the PSTN telephone number of the calling IP telephone apparatus from the URI in the received NAPTR resource record, while sounding the ringing tone; and
control the display to display a caller's name associated with the retrieved PSTN telephone number of the calling IP telephone apparatus in the phonebook, while sounding the ringing tone,
wherein the sounding, the transmitting the request, the receiving, the retrieving and the displaying by the controller are performed after the INVITE message is received by the called IP telephone apparatus and before an off-hook operation by the user of the called IP telephone apparatus is detected.

2. An IP telephone system, comprising:
the calling IP telephone apparatus that sends an INVITE message to start a call;
the called IP telephone apparatus according to claim 1;
the call agent apparatus that receives the INVITE message sent from the calling IP telephone apparatus and sends the INVITE message to the called IP telephone apparatus; and
the ENUM server,
wherein the ENUM server comprises:
a memory that stores a NAPTR resource record, the NAPTR resource record including a URI corresponding to an ENUM domain name;
an interface configured to receive, from the called IP telephone apparatus, the request for transmitting, to the called IP telephone apparatus, the NAPTR resource record corresponding to the ENUM domain name obtained from the IP telephone number of the calling IP telephone apparatus included in the INVITE message, the corresponding NAPTR resource record including the URI, the URI including the PSTN telephone number of the calling IP telephone apparatus; and
a controller configured to transmit, to the called IP telephone apparatus, the corresponding NAPTR resource record to the called IP telephone apparatus.

3. A method for receiving a call at a called IP telephone connected to an ENUM server and to a call agent apparatus, the ENUM server storing a NAPTR (Naming Authority Pointer) resource record, the NAPTR resource record including a URI corresponding to an ENUM domain name, the call agent apparatus controlling a connection between the called IP apparatus and a calling IP telephone apparatus, the method comprising:
receiving an INVITE message from the call agent apparatus, the INVITE message including an IP telephone number of the calling IP telephone apparatus, the IP telephone number being utilizable for making a call via the Internet;
sound a ringing tone at the called IP telephone apparatus to alert a user of the called IP telephone apparatus, upon receiving the INVITE message;
extract the IP telephone number of the calling IP telephone apparatus from the INVITE message while sounding the ringing tone;
transmitting, while sounding the ringing tone, to the ENUM server, a request for transmitting, to the called IP telephone apparatus, the NAPTR resource record corresponding to an ENUM domain name obtained from the IP telephone number of the calling IP telephone apparatus in the INVITE message, upon receiving the INVITE message, the NAPTR resource record including the URI, the URI including a PSTN (Public Switched Telephone Networks) telephone number of the calling IP telephone apparatus, the PSTN telephone number being utilizable for making a call via a PSTN and being distinct from the IP telephone number;
receiving the corresponding NAPTR resource record from the ENUM server, while sounding the ringing tone;
retrieving the PSTN telephone number of the calling IP telephone apparatus from the URI in the received NAPTR resource record, while sounding the ringing tone;
searching a phonebook including PSTN telephone numbers respectively associated with caller's names, while sounding the ringing tone; and
controlling a display to display a caller's name associated with the PSTN telephone number of the calling IP telephone apparatus, retrieved from the phonebook, while sounding the ringing tone,
wherein the sounding, the transmitting the request, the receiving, the retrieving and the displaying by the controller are performed after the INVITE message is received by the called IP telephone apparatus and before an off-hook operation by the user of the called IP telephone apparatus is detected.

* * * * *